US007133769B2

(12) United States Patent
Jung

(10) Patent No.: US 7,133,769 B2
(45) Date of Patent: Nov. 7, 2006

(54) LAYOUT MODELING SYSTEM FOR A TRANSPORT SYSTEM

(75) Inventor: Jung-ju Jung, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 60 days.

(21) Appl. No.: 10/682,535

(22) Filed: Oct. 10, 2003

(65) Prior Publication Data

US 2004/0158394 A1 Aug. 12, 2004

(30) Foreign Application Priority Data

Feb. 10, 2003 (KR) ..................... 10-2003-0008276

(51) Int. Cl.
*G01C 21/34* (2006.01)

(52) U.S. Cl. ....................... 701/201; 701/209; 701/210

(58) Field of Classification Search ........ 701/200–202, 701/207, 23–26, 209–215, 117; 340/988; 342/357.06
See application file for complete search history.

(56) References Cited

U.S. PATENT DOCUMENTS

| | | | | |
|---|---|---|---|---|
| 6,192,314 | B1 * | 2/2001 | Khavakh et al. | 701/209 |
| 6,285,951 | B1 | 9/2001 | Gaskins et al. | |
| 6,615,130 | B1 * | 9/2003 | Myr | 701/117 |
| 6,735,518 | B1 * | 5/2004 | Kim | 701/209 |
| 6,816,784 | B1 * | 11/2004 | Khan et al. | 701/213 |

FOREIGN PATENT DOCUMENTS

| | | |
|---|---|---|
| JP | 4-64106 | 2/1992 |
| JP | 9-319433 | 12/1997 |
| JP | 11-175152 | 7/1999 |
| JP | 11-175154 | 7/1999 |
| KR | 137204 | 2/1998 |
| KR | 2000-1010 | 1/2000 |
| KR | 2000-64681 | 11/2000 |
| KR | 2001-74357 | 8/2001 |
| KR | 2001-78287 | 8/2001 |

OTHER PUBLICATIONS

The First Office Action issued by the State Intellectual Property Office of People's Republic of China in Application No. 200310101451.6 dated Mar. 10, 2006 (total of 10 pages).

* cited by examiner

*Primary Examiner*—Y. Beaulieu
(74) *Attorney, Agent, or Firm*—Staas & Halsey LLP

(57) ABSTRACT

A layout modeling system for a transport system to transport articles from a starting position to a plurality of target positions along a transport route includes a plurality of nodes having location information to respectively correspond to the starting position and the target positions at which the articles are transported. The layout modeling system also includes a plurality of links to connect respective nodes along the transport route and having route information to correspond to respective routes between the respective nodes. The route information of each link is updated in real time. Thus, the layout modeling system is capable of minimizing labor and time and setting up an optimum transport route.

13 Claims, 3 Drawing Sheets

LAYOUT MODELING SYSTEM FOR A TRANSPORT SYSTEM

CROSS-REFERENCE TO RELATED APPLICATIONS

This application claims the benefit of Korean Patent Application No. 2003-8276, filed Feb. 10, 2003, in the Korean Intellectual Property Office, the disclosure of which is incorporated herein by reference.

BACKGROUND OF THE INVENTION

1. Field of the Invention

The present invention relates to a layout modeling system for a transport system, and more particularly, to a layout modeling system for a transport system which allows the transport system to implement optimum efficiency.

2. Description of the Related Art

A transport system is herein defined as a system that transports an article from a starting position to a target position along a real layout, which is an area for a transport route of the article.

A layout modeling system having information corresponding to the layout is necessary to implement the transport system.

Hereinafter, a layout modeling system for a transport system will be described based on a layout according to an example of a transport system as shown in FIG. 1.

As shown in FIG. 1, a real layout 1 according to an example of the transport system includes two transport routes 6*a* and 6*b* provided in a production line and formed in a closed loop. The real layout 1 includes a processing equipment 3 provided adjacent to the transport routes 6*a* and 6*b* to process a transported article, a plurality of storehouses 11, 21 and 31 to transport and stock the article, and a plurality of vehicles 8*a* and 8*b* to travel on the transport routes 6*a* and 6*b* to transport the article.

The transport routes 6*a* and 6*b* include a first transport route 6*a* installed on the ground and a second transport route 6*b* installed in an overhead type device.

The transport vehicles 8*a* and 8*b* include a plurality of first transport vehicles 8*a* to travel on the first transport route 6*a* and a plurality of second transport vehicles 8*b* to travel on the second transport route 6*b* to transport the article.

The processing equipment 3 is installed adjacent to the first transport route 6*a*, and has a processing equipment port 4 to receive the article transported by the first transport vehicles 8*a* or to transport a processed article to the first transport vehicles 8*a*.

The storehouses 11, 21 and 31 include a first storehouse 11 and a second storehouse 21 provided adjacent to the first transport route 6*a* and the second transport route 6*b*, and a third storehouse 31 provided adjacent to the second transport route 6*b*.

The first storehouse 11 has a first port 13 and a second port 15 to transport the article from or to the first and the second transport vehicles 8*a* and 8*b* traveling on the first and the second transport route 6*a* and 6*b*. The first storehouse 11 also has a first shelf 19 to stock thereon the transported article, and a first crane 17 provided in the first storehouse 11 to transport the article between the first port 13, the second port 15, and the first shelf 19.

The second storehouse 21, like the first storehouse 11, has a third port 23 and a fourth port 25 to transport the article from or to the first and the second transport vehicles 8*a* and 8*b* traveling on the first and the second transport routes 6*a* and 6*b*. The second storehouse 21 also has a second shelf 29 to stock thereon the transported article, and a second crane 27, provided in the second storehouse 21 to transport the article between the third port 23, the fourth port 25, and the second shelf 29.

The third storehouse 31 has a fifth port 33 to transport the article from or to the second transport vehicle 8*b* traveling on the second transport route 6*b*, a third shelf 39 to stock thereon the transported article, and a third crane 37 provided in the third storehouse 31 to transport the article between the fifth port 33 and the third shelf 39.

With the above configuration, the real layout 1 according to the transport system described above allows an article to be transported by the first and the second transport vehicles 8*a* and 8*b* traveling on the first and the second transport routes 6*a* and 6*b*.

A layout modeling system 140 for a conventional transport system will be described based on the layout according to the transport system describe above with reference to FIG. 2.

As shown in FIG. 2, the layout modeling system 140 for the conventional transport system has first through sixth nodes 151–156 to correspond to respective ports at which an article is transported (that is, the processing equipment port 4, and first through fifth ports 13, 15, 23, 25, and 33).

According to a route selecting method of using the nodes, an appropriate route is selected from transport route data (TABLE 1) which registers all routes allowing an article to be transported. The route selecting method is repeatedly performed, to thereby enable a final route to be selected.

The following TABLE 1 shows the transport route data according to the layout modeling system 140 for the conventional transport system shown in FIG. 2.

TABLE 1

| Transport route |
|---|
| 1$^{st}$ node 151 → 2$^{nd}$ node 152 |
| 1$^{st}$ node 151 → 4$^{th}$ node 154 |
| 2$^{nd}$ node 152 → 1$^{st}$ node 151 |
| 2$^{nd}$ node 152 → 3$^{rd}$ node 153 |
| 2$^{nd}$ node 152 → 4$^{th}$ node 154 |
| 3$^{rd}$ node 153 → 2$^{nd}$ node 152 |
| 3$^{rd}$ node 153 → 5$^{th}$ node 155 |
| 3$^{rd}$ node 153 → 6$^{th}$ node 156 |
| 4$^{th}$ node 154 → 1$^{st}$ node 151 |
| 4$^{th}$ node 154 → 2$^{nd}$ node 152 |
| 4$^{th}$ node 154 → 5$^{th}$ node 155 |
| 5$^{th}$ node 155 → 3$^{rd}$ node 153 |
| 5$^{th}$ node 155 → 4$^{th}$ node 154 |
| 5$^{th}$ node 155 → 6$^{th}$ node 156 |
| 6$^{th}$ node 156 → 3$^{rd}$ node 153 |
| 6$^{th}$ node 156 → 5$^{th}$ node 155 |

With the above configuration, in the layout modeling system 140 for the conventional transport system, route selection using the TABLE 1 will be described below.

As an example, it is assumed that an order in which the starting position of an article corresponds to the processing equipment 3 and the target position of the article corresponds to the third storehouse 31. An appropriate route then is selected by searching all available transport routes in the TABLE 1 to select the transport route from the first node 151 corresponding to the processing equipment port 4 to the sixth node 156 corresponding to the fifth port 33 of the third storehouse 31. Herein, a standard for an optimum route selection is based on a transport distance. That is, transport routes available at the first node 151 are the transport routes from the first node 151 to the second node 152 and the fourth node 154. If the second node 152 is selected as an appropriate transport route, the second node 152 selects a following transport route in the same way as the first node 151, to thereby enable the optimum route to be selected.

Thus, in the layout modeling system 140 for the conventional transport system, the article is transported along the optimum route selected by using the TABLE 1.

However, according to the layout modeling system for the conventional transport system, the transport route data on the TABLE 1 has to be written by hand to implement the transport system. Accordingly, if the size of the transport route data is large, writing by hand becomes a very labor- and time-consuming job.

Also, when being implemented by hand, the layout modeling system for the conventional transport system cannot select an optimum transport route because it cannot reflect all kinds of real-time information once a final route is selected.

SUMMARY OF THE INVENTION

Accordingly, it is an aspect of the present invention to provide a layout modeling system for a transport system capable of saving labor and time, and selecting an optimum transport route.

Additional aspects and advantages of the invention will be set forth in part in the description which follows and, in part, will be obvious from the description, or may be learned by practice of the invention.

The foregoing and/or other aspects of the present invention are achieved by providing a layout modeling system for a transport system to transport articles from a starting position to a plurality of target positions along a transport route. The layout modeling system includes a plurality of nodes having location information to respectively correspond to the starting position and the target positions at which the articles are transported, and a plurality of links to connect the respective nodes along the transport route and having route information corresponding to respective routes between the respective nodes. The route information of each link of the plurality of links is updated in real time.

According to an aspect of the invention, the route information of each link includes a distance and rotation angle between the respective nodes connected by the respective link, and further includes speed and an occupation ratio of a transport vehicle traveling on the transport route between the respective nodes.

According to an aspect of the invention, at least one of the starting position and the plurality of target positions include a storehouse of the articles, and the nodes are provided to respectively correspond to ports provided in the storehouse and to allow the articles to be transported thereto or therefrom. At least one on the starting position and the plurality of target positions also include shelves on which the articles are loaded, and a transporting unit to load and unload the articles on the respective shelf.

According to an aspect of the present invention, the route information of the links to connect the nodes provided in the storehouse further includes an amount of articles stocked in the storehouse.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
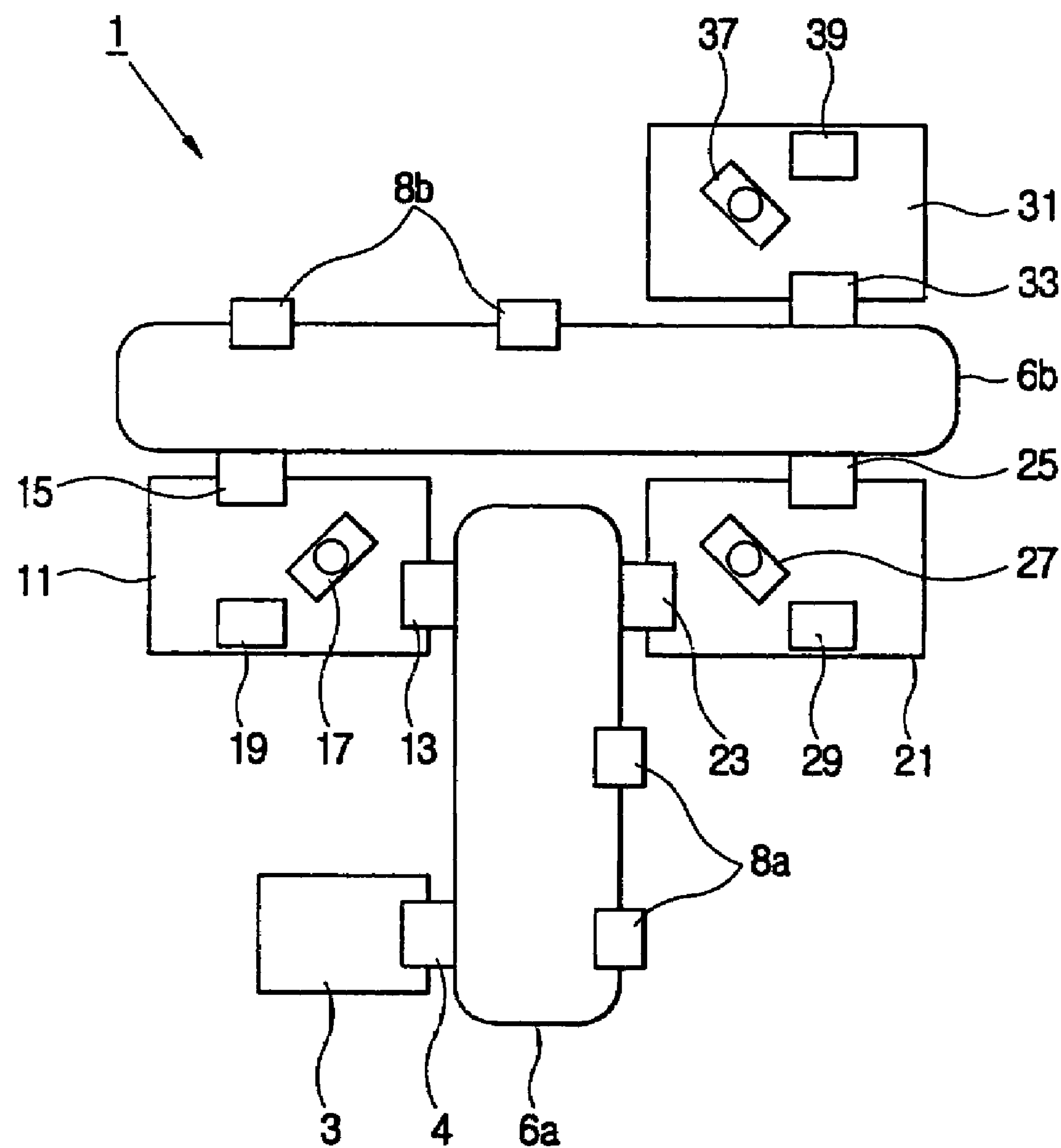
FIG. 1 is a plan view of a real layout, according to an example of a conventional transport system.
Figure 2:
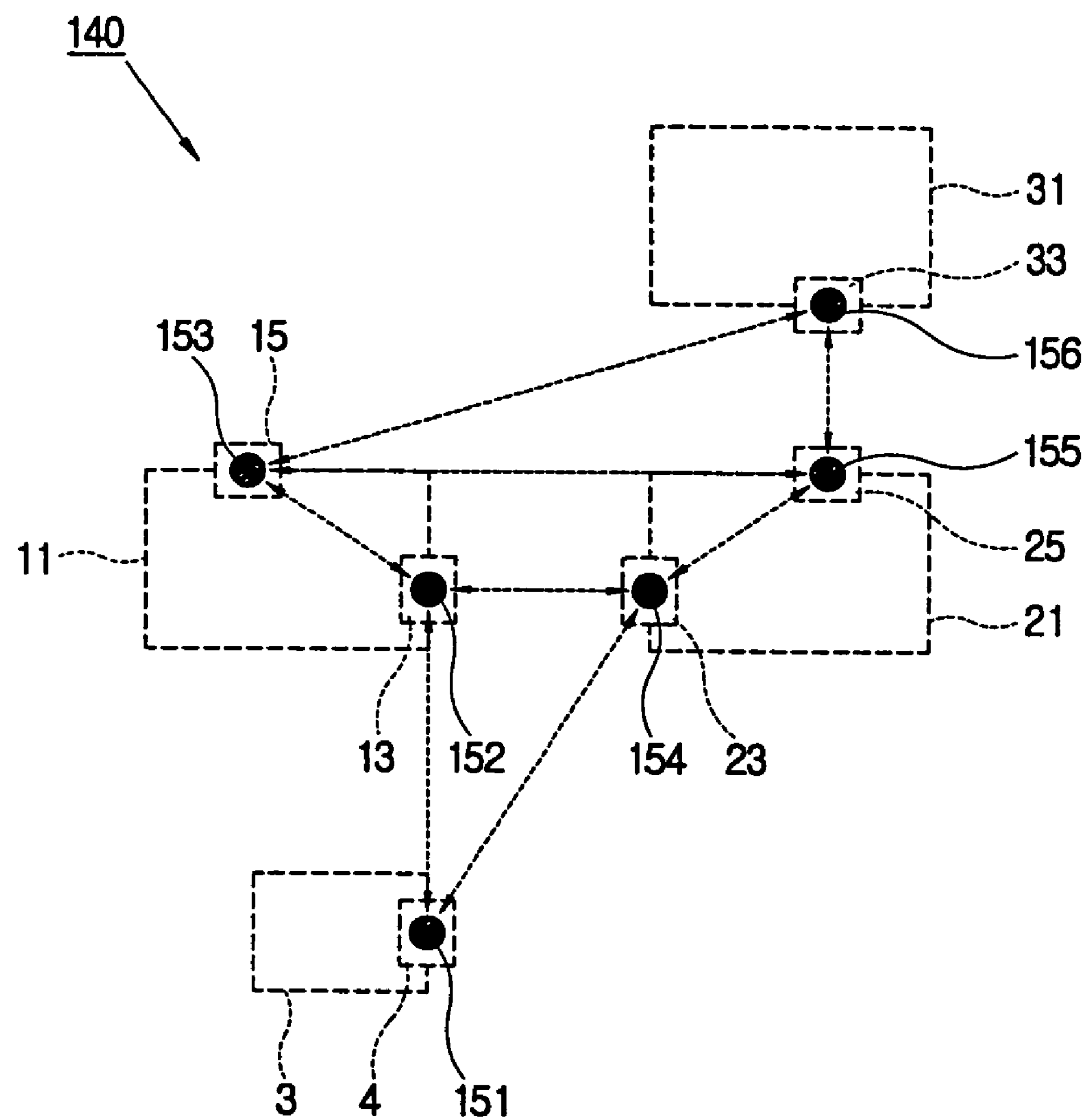
FIG. 2 is a layout modeling system for the conventional transport system of FIG. 1.

Reference will now be made in detail to the embodiments of the present invention, examples of which are illustrated in the accompanying drawings, wherein like reference numerals refer to like elements throughout. The embodiments are described below in order to explain the present invention by referring to the figures.

A layout modeling system 40 for a transport system, according to an embodiment of the present invention will be described based on the real layout 1 of the example of the transport system as described with reference to FIG. 1.

Figure 3:
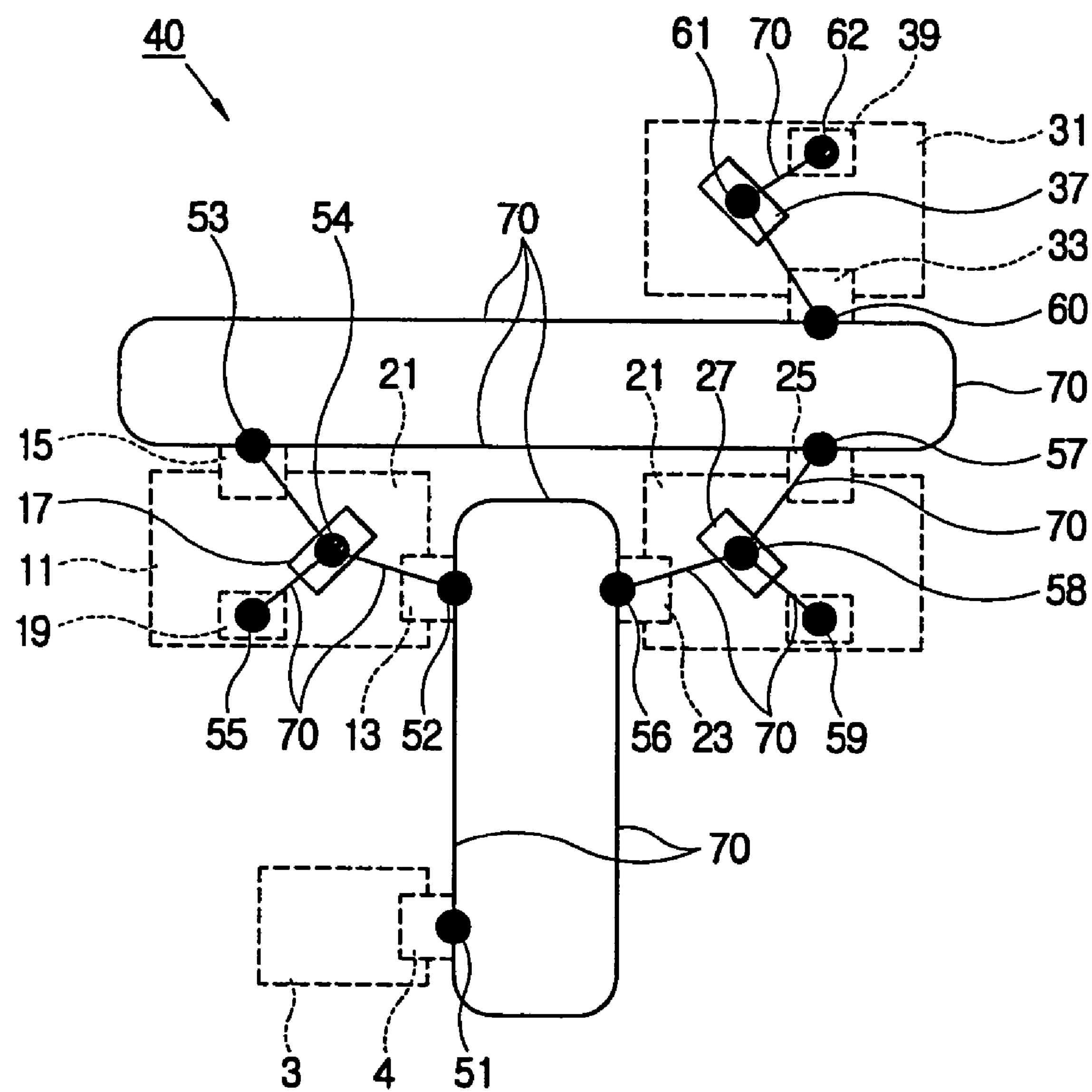
FIG. 3 is a layout modeling system for a transport system, according to an embodiment of the present invention.

As shown in FIG. 3, the layout modeling system 40 for the transport system according to the present invention includes a plurality of nodes 51 through 62 having position information to respectively correspond to starting positions and target positions at which an article is transported. The layout modeling system 40 includes a plurality of links 70 to connect the nodes 51 through 62 to each other along transport routes 6*a* and 6*b*, and having route information to correspond to the transport routes 6*a* and 6*b* between the respective nodes 51 through 62.

The respective starting position and target position may correspond to a processing equipment 3 and storehouses 11, 21 and 31 at which the article is transported.

The nodes 51 through 62 are provided to respectively correspond to respective ports 13, 15, 23, 25, and 33 provided in respective storehouses 11, 21 and 31, and to allow the article to be transported thereto or therefrom. The nodes 51 through 62 also correspond to respective shelves 19, 29 and 39 on which the article is loaded, and respective cranes 17, 27 and 37 to load and unload the article on the respective shelves 19, 29 and 39.

The nodes 51 through 62 include a first node 51 having position information to correspond to a processing equipment port 4 of a processing equipment 3, a second node 52 and a third node 53 having position information to respectively correspond to a first port 13 and a second port 15 provided in a first storehouse 11, a fourth node 54 and a fifth node 55 having position information to respectively correspond to a first crane 17 and a first shelf 19 provided in the first storehouse 11, and a sixth node 56 and a seventh node 57 having position information to respectively correspond to a second port 23 and a fourth port 25 provided in a second storehouse 21. The nodes 51 and 62 also include an eighth node 58 and a ninth node 59 having position information to respectively correspond to a second crane 27 and a second shelf 29 provided in the second storehouse 21, and a tenth node 60, an eleventh node 61, and a twelfth node 62 having position information to respectively correspond to a fifth port 33, a third crane 37, and a third shelf 39 provided in a third storehouse 31.

The position information of the nodes 51 through 62 includes coordinates set up on a display screen to correspond to the processing equipment port 4 and storehouses 11, 21 and 31.

The links 70 are provided to connect the nodes 51 through 62 to each other, and are set up along a route like the transport routes 6*a* and 6*b* between the nodes 51 through 62.

The route information of the links 70 include a distance and rotation angle between the nodes 51 through 62 connected by the links 70, in addition to speed and an occupation ratio of transport vehicles 8*a* and 8*b* traveling on the transport routes 6*a* and 6*b* between the nodes 51 through 62. The route information includes information of errors generated between the nodes 51 through 62 and is updated according to real-time transport circumstances. The route information of the links 70 connecting the nodes 52 through 62 provided in storehouses 11, 21 and 31 further includes an article amount loaded on the storehouses 11, 21 and 31.

Among the route information of the links 70, the distance indicates a transport distance to correspond to the transport routes 6*a* and 6*b* between the nodes 51 through 62, and the rotation angle indicates an angle in which the transport vehicles 8*a* and 8*b* rotate during travel in a case in which the transport routes 6*a* and 6*b* are curved. The speed indicates speeds of the transport vehicles 8*a* and 8*b* traveling between the nodes 51 through 62, and the occupation ratio indicates the number of the vehicles 8*a* and 8*b* between the nodes 51 through 62. The article amount indicates the amount of articles loaded on the storehouses 11, 21 and 31. The errors indicate unexpected accidents that may happen between the nodes 51 through 62, and poor operations and breakdowns caused by accidents occurring at respective ports corresponding to the respective nodes, or at processing equipment and storehouses provided with the nodes 51 through 62. Thus, each link 70 transports the route information to the transport system, so that an optimum route may be selected.

According to the above configuration, route selection using the layout modeling system 40 for the transport system according to the present invention will be described below.

As an example, it is assumed that a job order in which the starting position of an article indicates the processing equipment port 4 and the target position of the article indicates the third storehouse 31. The transport system sets up an optimum route from the first node 51 corresponding to the processing equipment port 4 to the tenth node 60 corresponding to the fifth port 33 of the third storehouse 31. Thus, the route to reach the target position, the tenth node 60, may be set up as follows.

The transport system searches the route information of all the links 70 connected from the first node 51 and selects an optimum link 70 which allows the article to be transported to the tenth node 60 fastest. Accordingly, the route to reach the tenth node 60, the target position, may be selected. Also, the transport system may set up an optimum route again by updating and reflecting the route information of each link 70 in real time even while the article is transported.

According to the configuration above, the layout modeling system for the transport system of the present invention does not only set up an optimum route, but also saves labor— and time— since transport route data does not have to be written. Therefore, the present invention provides a layout modeling system for a transport system capable of saving labor and time and setting up an optimum transport route. Further, the optimum transport route may be set up by updating and reflecting route information of respective links in real time.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A layout modeling system for a transport system to transport articles from a starting position to a plurality of target positions along a transport route, comprising:

a plurality of nodes having location information to respectively correspond to the starting position and the target positions at which the articles are transported; and a plurality of links to connect the respective nodes along the respective transport route and having route information to correspond to respective routes between the respective nodes, the route information of each link of the plurality of links being updated in real time, and comprises errors generated between the nodes which is updated based on real time circumstances.

2. The layout modeling system for a transport system according to claim 1, wherein the route information of each link comprises:

a distance and rotation angle between the respective nodes connected by the respective link; and speed and an occupation ratio of transport vehicles traveling on the transport route between the respective nodes.

3. The layout modeling system for a transport system according to claim 2, wherein at least one of the starting position and the plurality of target positions comprises:

a storehouse of the articles, and the nodes are provided to respectively correspond to ports provided in the storehouse and to allow articles to be transported thereto or therefrom;

shelves on which the articles are loaded; and a transporting unit to load and unload the articles on the respective shelf.

4. The layout modeling system for a transport system according to claim 3, wherein the route information of the links to connect the nodes provided in the storehouse further comprises:

an amount of articles stocked in the storehouse.

5. The layout modeling system for a transport system according to claim 2, wherein the route information on the distance indicates a transport distance to correspond to the respective routes between the respective nodes.

6. The layout modeling system for a transport system according to claim 2, wherein the route information on the rotation angle indicates an angle in which the transport vehicles rotate during travel in an instance in which the transport route is curved.

7. The layout modeling system for a transport system according to claim 2, wherein the route information on the speed indicates speeds of the transport vehicles traveling between the nodes.

8. The layout modeling system for a transport system according to claim 2, wherein the route information on the occupation ratio indicates a number of the transport vehicles between the nodes.

9. The layout modeling system for a transport system according to claim 3, wherein the route information on the errors indicate unexpected accidents occurring between the nodes, and poor operations and breakdowns caused by accident occurring at respective ports corresponding to the respective nodes.

10. The layout modeling system for a transport system according to claim 3, wherein the route information on the errors indicated unexpected accidents occurring at a respective storehouse or a processing equipment location.

11. A method of selecting an optimum transport route to transport articles from a starting position to a plurality of target positions along a transport route, the method comprising:

providing a plurality of nodes having location information to respectively correspond to the starting position and the target positions at which the articles are transported;

providing a plurality of links to connect the respective nodes along the respective transport route and having route information to correspond to respective routes between the respective nodes, the route information includes errors generated between nodes which is updated based on real time circumstances;

searching the route information of the respective links connected via the respective node corresponding to the starting position; and selecting the transport route which allows articles to be transported from the starting position to a designated target position the fastest as the optimum transport route.

12. The method according to claim 11, wherein the route information of the links comprises:

a distance and rotation angle between the respective nodes connected by the respective link;

speed and an occupation ratio of transport vehicles traveling on the transport route between the respective nodes; and an amount of articles stocked in a storehouse of at least one of the starting position and the target positions.

13. A layout modeling system for a transport system to transport articles from a starting position to a plurality of target positions along a transport route, comprising:

a plurality of nodes having location information to respectively correspond to the starting position and the target positions at which the articles are transported;

a plurality of links to connect the respective nodes along the respective transport route and having route information to correspond to respective routes between the respective nodes, the route information includes errors generated between nodes which is updated based on real time circumstances;

a searching unit to search the route information of the respective links connected via the respective node corresponding to the starting position; and a selecting unit to select the transport route which allows articles to be transported from the starting position to a designated target position the fastest as the optimum transport route.

* * * * *